(No Model.)
W. H. HELTON.
NUT LOCK.
No. 537,639. Patented Apr. 16, 1895.
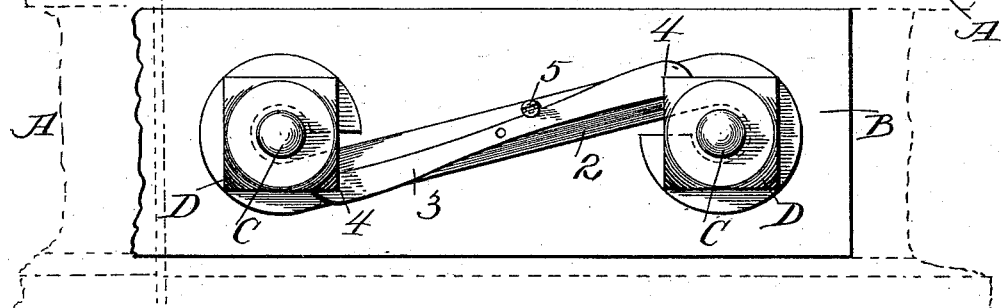
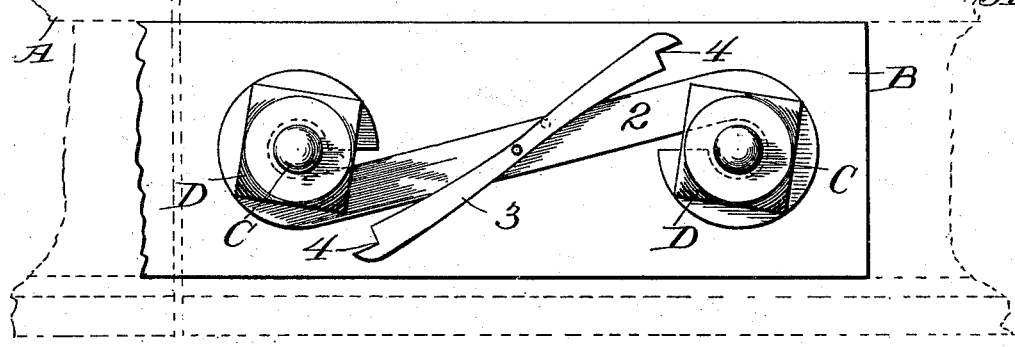
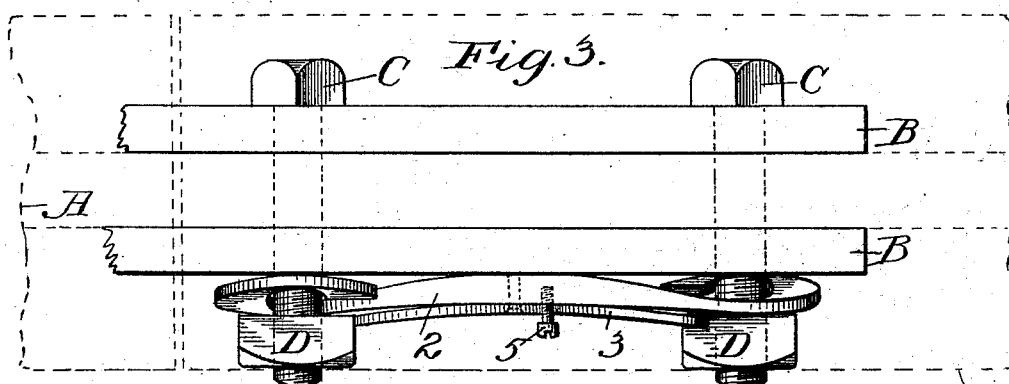
Witnesses
Chas. W. Parkis.
J. S. Barker.
Inventor
William H. Helton
By Charles & William B. King
Attys.

UNITED STATES PATENT OFFICE.

WILLIAM H. HELTON, OF BEN HADEN, FLORIDA.

NUT-LOCK.

SPECIFICATION forming part of Letters Patent No. 537,639, dated April 16, 1895.

Application filed September 12, 1894. Serial No. 522,852. (No model.)

*To all whom it may concern:*

Be it known that I, WILLIAM H. HELTON, a citizen of the United States, residing at Ben Haden, in the county of Wakulla and State of Florida, have invented certain new and useful Improvements in Nut-Locks; and I do hereby declare the following to be a full, clear, and exact description of the invention, such as will enable others skilled in the art to which it appertains to make and use the same.

This invention relates to nut-locks, particularly to that class of nut-locks which are used to hold properly in place, the bolts employed to hold together the adjacent ends of railway rails; and it has for its object to produce a nut-locking device which shall be practicable and certain in its operation, not liable to get out of order or become broken, one which will be easily applied, but which will be, at the same time, not easily unlocked unless the person be provided with the proper tools for that purpose.

In the drawings, Figures 1 and 2 are side views of my improved nut-lock showing the parts in two different positions. Fig. 3 is a top plan view of the device.

In the drawings, A, A, represent the railway rails; B, the fish plate; C, the bolts passing through the rails and fish plate, and D, the nuts thereon, these parts being of any usual or preferred construction.

2 represents a spring washer interposed between the nut and the fish plate or bar. I prefer to make this spring washer of the shape shown in the drawings, that is to say, of S-shape so that a single washer may be used in connection with two nuts. This spring washer is thickened at its center so that its ends will set off from the fish plate or bar, while its central portion rests against the same, as illustrated in Fig. 3.

3 is a locking bar arranged to engage with a nut and to hold it from turning. The end of this locking bar is formed so as to constitute a shoulder 4, which is adapted to engage with one of the corners of the nut. I prefer that this locking bar should be pivotally connected to the intermediate portion of the spring washer 2, and of a length sufficient to have its opposite ends engage with the two nuts under which lie the spring ends of the washer 2. By turning the locking bar into the position shown in Fig. 2, its ends are caused to disengage the nuts, which can then be turned in either direction.

I prefer, as stated, that the locking bar and the spring washer should be connected together, as thereby the number of parts as well as the liability of loss, is reduced. There might of course, be two independent locking bars, each secured to the spring washer near the nut which the lock is to hold, but such a construction is not so desirable as the one shown.

In order to hold the locking bar in engagement with the nuts and in position to lock them, I employ a bolt 5, which is adapted to be screwed into a hole in the intermediate portion of the spring washer and to bear against the edge of the locking bar to prevent it from moving away from the nuts. The position of the hole into which the said bolt is screwed, is such that it is close beside the edge of the bar 2 when the ends of the latter are in proper engagement with the corners of the nuts which they are to hold.

In applying my invention, the coiled ends of the spring washer plate or bar are slipped over the bolts and then the nuts screwed thereon. The nuts are screwed, by means of a suitable wrench, sufficiently far upon the bolts to properly compress the spring washer, the locking bar in the meantime being turned into the position indicated in Fig. 2, that is, away from engagement with the nuts. When the nuts are screwed sufficiently tight, the locking bar is thrown into engagement therewith, the nuts being turned into positions a little in advance of those which they occupy when the parts are finally locked together as shown in Fig. 1. After the locked bar is brought into engagement with the nuts and the shoulder ends thereof made to engage with the corners of the nuts, the latter are turned backward slightly so as to firmly engage with the bar, after which the locking pin or bolt 5 is screwed into the hole provided therefor. After these operations have been performed the parts cannot be moved except by first removing the locking pin or bolt 5, then turning the nuts 2 slightly forward, and finally throwing the locking bar 2 out of engagement therewith.

By making the spring washer of the shape shown and described, I not only make a single part to operate in connection with two bolts and nuts, but also cause the said washer to be held against rotation about the bolts, which is essential when the locking bar 3 is pivotally connected thereto; also by making the central portion of the spring washer bar thicker than its ends, as has been described, I make it possible to secure the locking bar thereto and yet have the latter set out far enough to easily and properly engage with the nuts, without making the locking bar unduly thick or having to bend it, at least to any considerable extent.

My invention is not expensive and yet is a practical device and will successfully operate to prevent the loosening of the nuts upon the bolts which connect the rails and fish plates.

Having thus described my invention, what I claim, and desire to secure by Letters Patent, is—

1. In a nut-locking device, the combination with the nut and bolt, of a spring washer suitably held against rotation upon the bolt, a locking plate or bar pivoted thereto and adapted to engage with the nut, and a locking pin or bolt which holds the said locking plate in engagement with the nut, substantially as set forth.

2. In a nut-locking device, the combination with a pair of bolts and nuts, of a washer plate 2, having spring portions under the said nuts, a locking bar or plate 3 pivoted to the intermediate portion of the said washer plate and having its opposite ends shaped to engage with and to hold the said nuts, and a locking pin or bolt 5 adapted to fit into a hole in the spring washer plate and to hold the locking bar in engagement with the nuts, substantially as set forth.

In testimony whereof I have affixed my signature in presence of two witnesses.

WILLIAM H. HELTON.

Witnesses:
A. E. TULLY,
J. M. RAWLES.